3,359,134
FUEL CELL INCLUDING PACKED CATALYTIC SUBSTANCE
André Salvadori, Paris, Philippe Lovy, Roissy-en-Brie, and Michel Beigelman, Villiers-Adam, France, assignors to Service National dit: Gaz de France, Paris, France, national service of France
Filed Dec. 4, 1962, Ser. No. 243,200
Claims priority, application France, Dec. 5, 1961, 881,055
3 Claims. (Cl. 136—86)

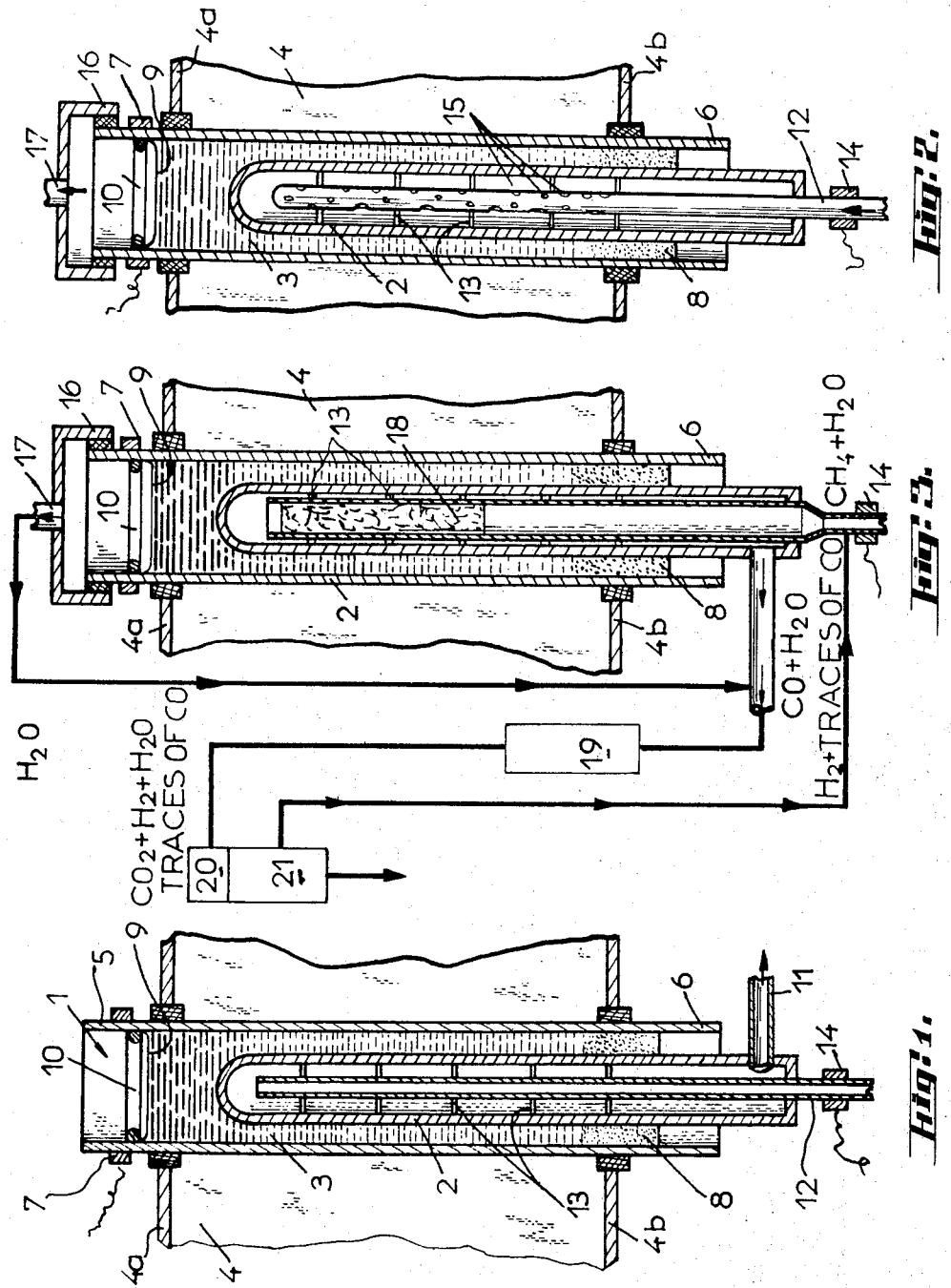

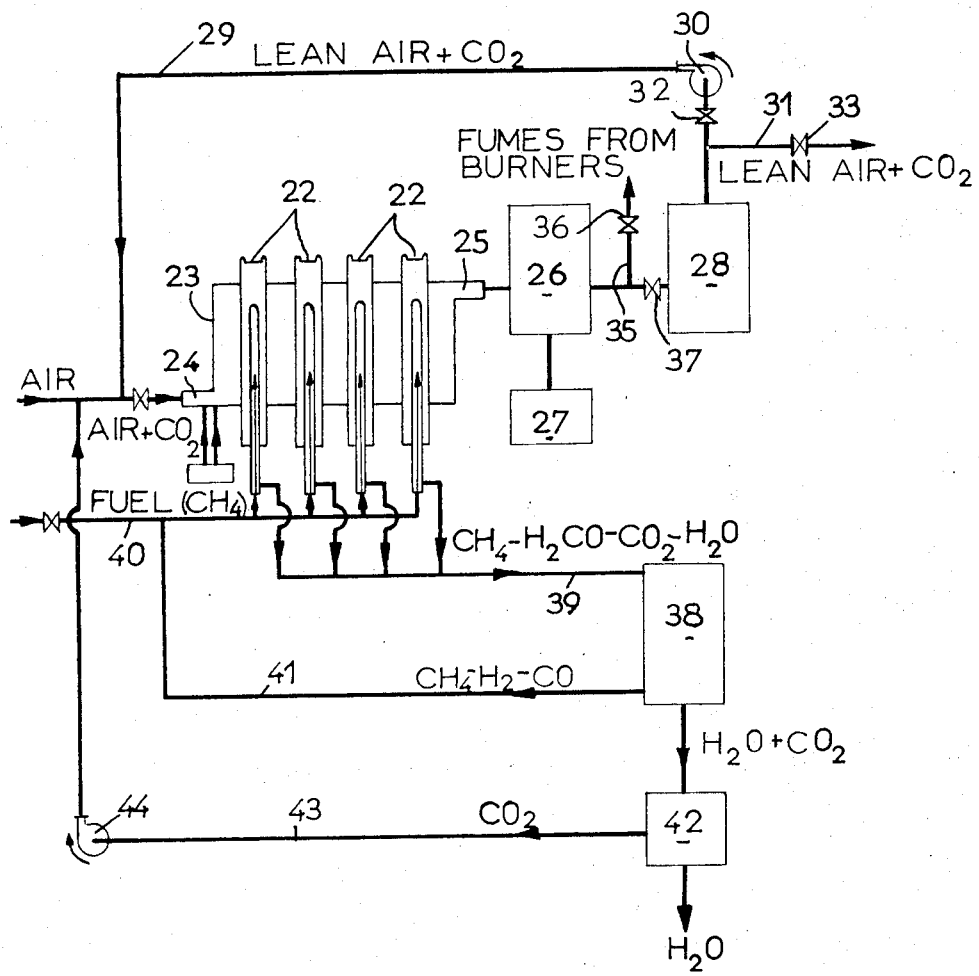

It is the essential object of the present invention to provide a method of constructing an electro-chemical generating device constituting a fuel cell operating preferably with gaseous fuel at a relatively high temperature with an electrolyte in the liquid state consisting of a molten salt or the like, as well as the cell elements and battery systems obtained therefrom.

The principle on which the so-called fuel cells are based is well known; these cells are capable of producing electric power from the chemical energy resulting from oxidation reactions of preferably gaseous fuels. This invention relates to gaseous fuel cells adapted to operate in particular with the following fuels: natural gas, town gas, water-steam reformed hydrocarbons, hydrogen, watergas, etc., and its primary object is to provide a fuel cell of improved technology, and fuel cell systems operating continuously and economically.

The method of constructing fuel cells according to this invention is characterized in that the vertical natural creep of said electrolyte, at least in one direction, between the lateral walls containing same, is prevented by cooling or maintaining locally at a temperature lower than its melting point, a fraction, which is in contact with said walls, of at least one of the two end layers of said electrolyte which bound its volume at the upper and lower portions thereof, in order to solidify or to keep in the solid state said fraction of electrolyte.

According to another feature of this invention, the layer or region of electrolyte constituting the base or lower end of the volume of said electrolyte is kept at a temperature lower than the melting point of said electrolyte with a view to keep said layer in the solidified state whereby constituting a self-sealing permanent closure plug adhering to said side walls and supporting the remaining portion of the electrolyte. This method allows to obtain effective tightness at the bottom of the cell, by forming a practically fluid-tight bottom layer closed by the electrolyte itself kept in the solid state. Any leakage hazards by cracking the solid phase or by variation in the thermal expansion of the different materials is precluded; in fact, the liquid phase would seep through the interstices thus created and solidify on contacting the cooler walls or portions.

According to another feature of this invention, the upward creep of said molten electrolyte along said side walls is prevented or stopped by cooling said side walls or keeping them, at the level or in the vicinity of the free upper surface of said electrolyte, at a temperature lower than, but sufficiently close to its melting point to allow the formation, along the border, of a peripheral permanent ring of solidified electrolyte adhering to said walls and inhibiting the creep phenomenon, the central portion inside said ring remaining preferably in the molten state. Thus, by a relatively moderate cooling of the walls, the inconvenience resulting from the creeping of molten electrolyte along the side walls containing same at the upper portion thereof which is due to surface tension phenomena, is efficiently avoided. In some cases, the fact that the central portion remains in the liquid state allows partial or complete eduction of the combustion products.

According to still another feature of this invention, the heat lost or released by said gaseous fuel cell is recovered at least partially either by effecting within the cell a continuous endothermic reaction producing the fuel utilized; such as a catalysed reforming, known per se, of a natural gas or a hydrocarbon by means of water steam, or by utilizing said heat for increasing by heating the enthalpy of a working substance or fluid with or without phase change, in an auxiliary apparatus, for the purpose of transforming energy, by using preferably as a heat transfer medium acting as a heat-conveying vehicle the residual gases constituting the waste combustive fluid.

According to still another feature of this invention the combustible substances and possibly the carbon dioxide present in the combustion products or in the residues of the aforesaid reforming reaction are recovered by chemical regeneration and/or by physical separation or treatment.

According to a further feature of this invention, to adjust the operating temperature, said fuel cell is adjusted by adding to said fresh combustive medium introduced into said cell and consisting for example of air possibly with the addition of carbon dioxide, at least one portion of the residual gases constituting the waste combustive medium (oxygen impoverished air in admixture or not with carbon dioxide) cooled beforehand, which is thus recycled, the remaining portion of said waste combustive medium being removed continuously with an exhaust flow rate substantially equal to the supply flow rate of fresh combustive medium.

This double recovery and this thermal control permit of establishing combustive medium and fuel circuits operating in nearly closed-cycles, and ensuring a continuous and particularly economical operation of the cells. In addition, the heat from the hot gases issuing from the cell at a temperature which may be of the order of 700° C. (1,292° F.) is thus recovered in the form of utilizable energy.

This invention is also concerned with an elementary gaseous fuel cell operated at high temperature and constructed according to the method broadly set forth hereinabove. Such a cell element pertains to the kind comprising at least two refractory porous hollow electrodes, i.e. a fuel electrode and an oxidizer electrode respectively, preferably of tubular configuration and disposed vertically in parallel concentric relationship; the oxidizer electrode is coated with a catalytic substance and surrounds the fuel electrode, while it is mounted itself in a vessel in which the combustive agent or oxidizer is circulated. The aforesaid electrolyte consisting of a molten salt is placed in the annular space between these electrodes.

The fuel cell according to this invention is characterized in that said oxidizer electrode preferably consists of a cylinder open at both opposite ends and extending in a fluid-tight manner through the walls of said oxidizer containing vessel, so that the two ends of said cylinder project externally from said vessel and lie in ambient zones wherein the temperature is kept below the melting point of said electrolyte, the column formed by said electrolyte projecting sufficiently outside said vessel at either end to cause the projecting bottom portion to remainin the solid state and constitute the aforesaid sealing plug, and to allow said ring of solidified electrolyte to form along the marginal portion of the free surface at the upper end.

According to another feature characterizing this invention, said fuel electrode is closed at either end and immersed in said electrolyte with its lower end projecting preferably outside said plug of solid electrolyte, and comprises a central inner duct for delivering the fuel which extends nearly to the top of said electrode, this duct being open at its upper end and opening in a fluid-tight manner through the bottom of said electrode so as to be connected to a source of fuel supply, said electrode being possibly provided with an exhaust pipe or the like near or at its lower end.

According to still another feature of this invention, said central duct consists of an electro conductive pipe connected to different points of the inner wall of said fuel electrode through conducting means such as a plurality of flexible or like metal rods disposed radially at spaced angular intervals along said pipe so that the latter forms a current collector and comprises to this end, a terminal.

The fuel cell thus obtained is particularly simple to construct and reliable in operation.

Finally, this invention contemplates the provision of electric current generating plants or systems designed for continuous operation and equipped with fuel cells of the type broadly set forth and constructed according to the teachings of the method disclosed hereinabove, which are characterized in that they comprise at least one battery of said elementary cells grouped preferably in clusters in a common oxidizer containing vessel and electrically interconnected in series and/or in parallel, means for cooling and recovering said waste heat, means for recycling the waste combustive agent or oxidizer for automatically controlling the operating temperature, means for preheating said cells before operating the plant or system, and possibly means for recovering any combustible substances and, if need be, the carbon dioxide gas from the combustion products.

Thus, a complete current-generating plant operating automatically and continuously is obtained.

Other objects and advantages will become apparent from the following description taken in conjunction with the accompanying drawings given by way of example only and in which:

FIGURE 1 illustrates diagrammatically in elevational view a longitudinal cross section of a gaseous fuel cell constructed according to the teachings of this invention;

FIGURE 2 is a similar view of a modified embodiment of the cell shown in FIGURE 1;

FIGURE 3 is a diagrammatic similar view of another form of embodiment of the cell element, and FIGURE 4 shows in block diagram form, a typical and exemplary embodiment of a plant for producing electric current from a battery of elementary cells according to this invention.

According to the embodiment shown in FIGURE 1, the elementary cell comprises a combustive agent or oxidizer electrode 1 consisting of a straight cylindrical tube open at either end, a fuel electrode 2 consisting of a rectilinear cylindrical tube closed at either end and disposed within and coaxially with the oxidizer electrode 1, and an electrolyte 3 consisting of molten salt placed in the oxidizer electrode 1 and filling particularly the annular space between both electrodes. The radial distance or relative spacing between the two electrodes remains constant therealong, and the electrode assembly is disposed preferably vertically.

The combustive agent which consists of an oxidizer such as oxygen for example or more simply atmospheric or ambient air with or without the addition of carbon dioxide gas, is fed to an oxidizer containing vessel 4 surrounding the oxidizer electrode 1 extending in a fluid-tight manner through the walls 4a and 4b of this vessel 4, so that the opposite ends 5 and 6 of this electrode project outwards of this vessel. The oxidizer electrode 1 acts as a conductor collecting the electric current and comprises to this end a terminal 7 integral with one of its free ends.

The length or height of the coulmn of electrolyte 3 is such that it projects outwards on the one hand substantially with its lower end 8 from the outer face of the lower wall 4b of vessel 4, and on the other hand to a relatively small extent with its upper end 9 from the top of the upper wall 4a of said vessel. Thus, the lower portion 8 of the electrolyte column which lies practically outside the hot reaction zone hence in a relatively cool zone, remains in the solid state and so forms an efficient plug for closing the bottom of the oxidizer electrode.

Similarly, in view of the lower temperature of the upper end 5 of the oxidizer electrode, which is due either to a natural cooling or to a moderate artificial cooling, a ring of solidified electrolyte 10 develops which leaves a central molten portion since the top 9 of the electrolyte column 3 projects outwards but a little from the vessel 4. This solidified electrolyte ring 10 will effectively prevent any upward creep of the electrolyte column 3 along the walls of the oxidizer electrode 1, as a result of surface tension phenomena.

The fuel electrode 2, which is immersed in the electrolyte preferably projects outwards and downwards from the oxidizer electrode 1. It is possibly provided at its lower portion with a discharge pipe 11. The fuel is fed through a central pipe or like duct 12 extending coaxially through and within the fuel electrode 2 and having its upper end open and adjacent or near the top of this electrode. Preferably, this pipe is made of conducting material so that it may act at the same time as a current collector. To this end, it is provided with a series of flexible metal rods or the like 13 engaging different points of the inner wall of electrode 2. A current pick-up terminal 14 is integral with the outside portion of this tube.

The fuel electrode may consist, in a manner known per se, either of graphite having a suitable porosity and impregnated with a noble metal such as platinum, palladium or any other metal selected from the same group, or of a refractory oxide coated with a layer of one of these noble or like metals, or of sintered agglomerates of the same materials, or of these materials in the massive state. The air electrode 1 may be made from a porous refractory oxide (magnesia, alumina, zirconia, iron oxide, etc.) rendered conductive by a metal deposit and coated with a catalyst, for example silver. It may also consist of sintered metals (silver, etc.).

During the cell operation, the combustive agent, consisting of ambient air or a mixture of air and carbon dioxide gas, blows through the vessel 4 past the outer wall of the air electrode 1. In the case of a cell battery all the cells are mounted preferably in a same common vessel in which this air stream is circulated. The fuel fed from the central duct 12 rises up to the top of this tube wherefrom it enters the fuel electrode along which it flows down while diffusing through the wall of said electrode. In a cell of the type illustrated by FIGURE 1, the fuel blow rate may be adjusted in two different ways:

(1) It may be so adjusted that the fuel has time enough to diffuse almost completely through the electrode 2 by flowing downwards along the wall, so that only the combustion products are discharged at the bottom through the pipe 11.

(2) The fuel may be supplied in excess to the cell at a relatively high rate of feed in order to eliminate from the gaseous stream the whole of the combustion products. In this case, the fuel should be separated from the combustion products at the outlet of pipe 11 in order to recover and recirculate same according to a continuous cycle.

FIGURE 2 illustrates an alternate embodiment wherein the fuel electrode 2 is devoid of any pipe or other discharge means. The central tube 12 is advantageously perforated with holes 15, that is, throughout its substantially useful length, inside the electrode 2. The oxidizer electrode 1 is closed at its top 5 by a sealing cap or like cover 16 provided with an outlet pipe or the like 17.

In this modified embodiment, the fuel is introduced at a substantially constant pressure into the electrode 2 at a rate practically equal to the fuel consumption. The whole of the combustion products diffuses and rises in bubbles in the electrolyte 3 wherein it is recovered at the upper free surface thereof and exhausted through the pipe 17.

The reforming of a natural gas or a hydrocarbon with water-steam for converting same into hydrogen and carbon monoxide, as described in U.S. Patent 3,288,647 may be carried out in a cell of this character. This procedure is advantageous in that it absorbs a substantial fraction of the heat released by the cell. An interesting modification may be contemplated in the case where the combustive agent is oxygen or air and the fuel is hydrogen, by producing this hydrogen in the cell itself through said reforming process, the hydrogen thus produced being extracted and fed directly into contact with the electrolyte by selective diffusion.

FIGURE 3 illustrates this alternate embodiment wherein the fuel electrode 2 is coated externally with an impervious layer of palladium, platinum or other metal pertaining to the same group, and contains a catalyst, for example a nickel catalyst 18. This impervious layer may consist of sheet or foil metal deposited on a support of very porous ceramic. Under these conditions, only the hydrogen from the hydrogen and carbon monoxide mixture will diffuse through the metal. Water steam, the only combustion product, is collected above the electrolyte by means of the exhaust pipe 17. The fuel electrode 2 is provided at its bottom with a discharge pipe 11 through which the carbon monoxide constituting the residual product of said reforming reaction is removed. The hydrogen contained in the combined state in the thus recovered water steam is regenerated in the free state by mixing the hydrogen with the carbon monoxide and causing this mixture to flow over a catalyst, for example an iron oxide catalyst contained in a catalyzing apparatus 19. Thus, the carbon monoxide is transformed into carbon dioxide gas by reduction of the water steam with consequent release of hydrogen. The resulting mixture consisting of carbon dioxide gas, hydrogen, steam and traces of carbon monoxide flows through a cooling device 20 and then through a pressure-water washing apparatus 21 in which the carbon dioxide gas is separated from the hydrogen by selective dissolution of the carbon dioxide, which may subsequently be recovered, if desired, by simple decompression. The hydrogen thus recovered is fed back to the fuel electrode. As the transformation of carbon monoxide takes place at a temperature which may be lower than the operating temperature of the cell, it may be necessary to partially cool the gases issuing from the fuel electrode.

This mode of operation permits of utilizing molten soda or potash instead of carbonates as an electrolyte and also of avoiding the addition of carbon dioxide gas to the combustive agent.

By way of example, a fuel cell of this type operating under the following conditions:

Combustive agent: air
Fuel: industrial hydrogen
Electrolyte: eutectic sodium carbonate and potassium carbonate
Operating temperature: 720° C. (1,328° F.)

gave the following experimental results, corresponding to the cell output under load:

Current density: 200 ma./sq. cm. (31 ma./sq. in.)
Voltage: 600 mv.

The same results are obtained by using natural gas reformed with water steam as a fuel.

FIGURE 4 illustrates diagrammatically and in block form a typical embodiment of a plant for producing electric current from a battery of cells of the type described hereinabove.

Such a battery comprises a number of cells 22 mounted in a common vessel 23 for a comustive agent. In this example the combustive agent consists of air in admixture with carbon dioxide gas, and the fuel of a hydrocarbon such as methane. In a specific form of embodiment, the battery cells are of the type illustrated in FIGURE 1, and it will be assumed that the fuel is fed thereto in excess.

This system will apply the principle of the cell operating temperature control based upon reprocessing one fraction of the waste combustive agent constituted by the mixture of lean air (i.e., low-oxygen air) with previously cooled carbon dioxide gas, and will make use of cooling means for partially recovering the heat contained in the hot gases constituting the waste combustive agent issuing from the vessel 23, as well as of means for recovering the combustible substances and the carbon dioxide gas contained in the combustion products exhausting from the fuel electrodes.

The air vessel 23 comprises an inlet 24 for fresh combustive agent and an outlet 25 for waste combustive agent. The means for cooling the hot gases issuing from the vessel 23 and for recovering the heat from these gases comprise at least one load apparatus consisting preferably of a heat exchanger 26 in the form of a steam boiler and adapted to operate a power engine 27, such as a turbine driving for example an electric generator or the like.

The inlet of this boiler is connected to the outlet 25 of the air vessel so that the waste hot gases flow therethrough. The gas outlet of boiler 26 is connected in series with a cooling apparatus 28 through which said hot gases are thus also caused to flow, the outlet of this apparatus 28 being connected on the one hand through a return duct 29 to the combustive agent inlet 24 of the air vessel by means of a fan 30, or any other equivalent blowing or circulating apparatus, and on the other hand to an exhaust duct 31 possibly connected to the inlet side of fan 30. Flow rate control members responsive to the operating temperature of the cell battery are provided on the return and exhaust ducts respectively. These members may consist of two remote-controlled valves or the like 32, 33 mounted the one on the return duct 29 between the fan 30 and the branch pipe or connection to the exhaust duct 31, and the other on this exhaust duct 31.

The preheating means for starting the operation of the cell battery consist of one or several burners 34 provided with automatic stop means such as thermostatic relays or the like, these burners being fed preferably with the same fuel as the cells, that is, in the case illustrated, with methane. The flues from these burners open into the inlet 24 of the air vessel 23. An exhaust duct 35 for discharging the fumes and smoke from the burners is branched off the pipe connection between the boiler 26 and the cooling apparatus 28, and adequate cut-off valves 36, 37 are provided in said duct 35 and before the cooling apparatus 28 respectively.

The gaseous products issuing from the fuel electrodes consist of the fuel excess (i.e. methane), hydrogen, carbon monoxide, carbon dioxide gas and steam. The means for recovering the combustible substances (methane, hydrogen, carbon monoxide) consist of a cooling and pressure water washing apparatus 38, the inlet of which is connected to the outlet 39 for the combustion products, that is, to the outlet of the fuel electrodes in the present example, while the outlet for combustible products is connected to the supply line 40 delivering fresh fuel through a branch pipe 41.

The device for recovering said carbon dioxide gas consists of a pressure-reducing apparatus 42 having its inlet connected to the water outlet of the washing apparatus 38 and its carbon dioxide gas outlet connected through a pipe 43 to the supply line of fresh combustive agent at the inlet 24 of the air vessel through the medium of a fan or pump 44.

This plant operates as follows: At the start, the combustive agent and fuel inlets being shut off, the burners 34 are ignited, their hot fumes flow through the air vessel 23 and then through the boiler 26 before being discharged into the flue 35, the valve 36 being open, and the valve 37 being closed. Thus, these fumes will preheat on the one hand the battery cells 22 and on the other hand the water in boiler 26. When the electrolyte has reached its melting temperature, the burners are stopped automatically by a thermostat and the air, fuel and reprocessing circuits are turned on. The recycling flow rate is adjusted automatically against the battery temperature.

The surrounding air added with this reprocessed gas and possibly with the carbon dioxide gas recovered from the combustion products, flows into the air vessel 23 at a suitable temperature set by the temperature of the recycled gases. The residual hot gases constituting the waste combustive agent and consisting of low-oxygen lean air and of carbon dioxide gas, leave the air vessel 23 and flow through the boiler 26 where one fraction of their heat is transferred to the water to produce steam for operating the turbine 27 of a turbo-generating set. Thus, a substantial part of the heat lost by Joule effect in the cell battery is recovered in the form of electric power. The gases issuing from the boiler flow through the cooling apparatus 28 in which they are further cooled to reduce their temperature to a value low enough to permit their recycling and their use as temperature controlling agent. One fraction of the gases issuing from the cooling apparatus 28 is removed continuously through the discharge duct 31 with an exhaust output or flow rate substantially equal to the fresh air input or supply flow rate at the inlet 24 of air vessel 23; the remaining fraction is returned by the fan 30 to this inlet where it mixes up with said fresh air. This recycling flow rate is adjusted automatically by the operation of valves 32, 33 responsive to the cell operating temperature.

Simultaneously with the combustive-agent supply, gaseous fuel (methane) is fed continuously into the cells 22. In this specific example, the fuel is delivered in excess into the fuel electrodes. The combustion products issuing from the battery cells, i.e. from the fuel electrodes, contain a substantial quantity of combustible products which are recovered as follows:

The combustible substances such as methane, hydrogen and carbon monoxide, either separately or in admixture, are practically insoluble in water. The mixture issuing from the electrodes is therefore fed to the cooling and pressure-water washing apparatus 38 in which said combustible products separate from the steam which condenses and from the carbon dioxide gas which dissolves. The mixture of methane, hydrogen and carbon monoxide thus recovered is fed to the fuel inlet 40 through the line 41.

This method is advantageous in that it allows easy recovery of carbon dioxide gas by decompression upon causing the water containing the dissolved carbon dioxide gas to flow from the apparatus 38 into an expansion chamber 42 wherein the carbon dioxide evolves in the gaseous state and may be possibly returned by the fan 44 through the line 43 to the air circuit inlet.

The cluster arrangement of the elementary cells is very advantageous owing to the fact that it is possible to remove any one of these cells without discontinuing the battery operation. Therefore the maintenance of the plant is considerably simplified.

Although the present invention has been described in conjunction with preferred embodiments, it is to be understood that modifications and variations may be resorted to without departing from the scope of the invention, as those skilled in the art will readily understand. Such modifications and variations are considered to be within the purview and scope of the invention and appended claims.

What we claim is:
1. A gaseous fuel cell, operating at high temperature with an electrolyte in the liquid state as a molten salt, a fuel and an oxygenated combustive agent, comprising two refractory hollow porous electrodes forming respectively an oxidizer electrode and a fuel electrode, disposed substantially vertically and in concentric parallel relationship, said oxidizer electrode surrounding said fuel electrode, a vessel containing said combustive agent and in which said oxidizer electrode is mounted, said electrolyte being located in the annular space between the electrodes, said oxidizer electrode having substantially the form of a tubular cylinder open at both ends and extending in a fluid-tight manner through the walls of said vessel with its both ends as well as the ends of the column of electrolyte therein projecting externally from said vessel, a sealing plug being provided at the lower end of said column of electrolyte, the fuel electrode being closed at both ends and immersed in said electrolyte with its lower end projecting outwards beyond said plug and said fuel electrode being coated with a layer of noble metal in the form of a foil on a very porous ceramic support, a central inner fuel-feed duct extending nearly to the top of said electrode, said duct being open at least at its top end and extending at its bottom end in a fluid-tight manner through the bottom of said electrode, said fuel-feed duct having an opening at its bottom end which is connected to a fuel supply, a steam cracking catalytic substance packed along at least a portion of said inner fuel-feed duct length, and a discharge pipe connected to the annular space between said fuel-feed duct and the inner wall of said fuel electrode adjacent the fuel supply inlet whereby heated gases which flow to the discharge pipe transfer heat to the fuel entering the fuel-feed duct.

2. A fuel cell as claimed in claim 1 wherein said catalyst is nickel.

3. A fuel cell as claimed in claim 1 wherein said catalyst is packed in the upper portion of the inner fuel-feed duct.

References Cited

UNITED STATES PATENTS

| 409,366 | 8/1889 | Mond et al. | 136—86 |
|---|---|---|---|
| 736,016 | 8/1903 | Reid | 136—86 |
| 1,124,347 | 1/1915 | Snelling. | |
| 1,182,759 | 5/1916 | Emanuel | 131—86 |
| 2,581,651 | 1/1952 | Gorin | 131—86 |
| 2,901,524 | 8/1959 | Gorin et al. | 131—86 |
| 2,946,836 | 7/1960 | Justi et al. | 131—86 |
| 3,106,494 | 10/1963 | Thorsheim | 136—86 |
| 3,146,131 | 8/1964 | Linden et al. | 131—86 |
| 3,148,089 | 9/1964 | Oswin | 131—86 |
| 3,177,097 | 4/1965 | Beals | 136—86 |

FOREIGN PATENTS

| 233,847 | 5/1961 | Australia. |
| 1,307,956 | 9/1962 | France. |
| 15,105 | 1885 | Great Britain. |

ALLEN B. CURTIS, *Primary Examiner.*

WINSTON A. DOUGLAS, *Examiner.*